Feb. 6, 1945.  R. C. GOCHT  2,369,039
TOOL SLIDE MECHANISM
Filed Nov. 26, 1940   4 Sheets-Sheet 2

INVENTOR
RUDOLPH C. GOCHT
BY
ATTORNEYS

Feb. 6, 1945.  R. C. GOCHT  2,369,039
TOOL SLIDE MECHANISM
Filed Nov. 26, 1940   4 Sheets-Sheet 3
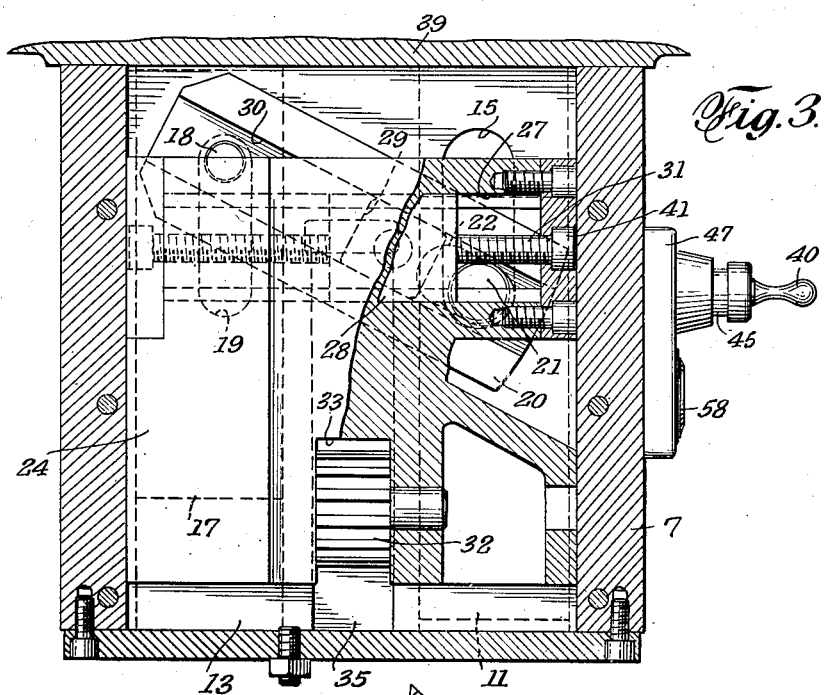
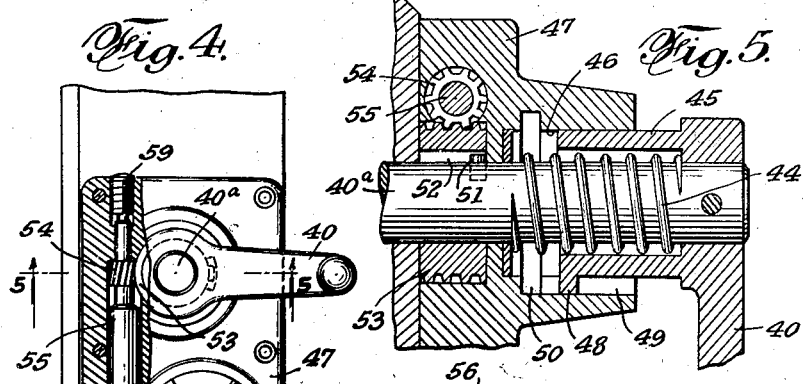
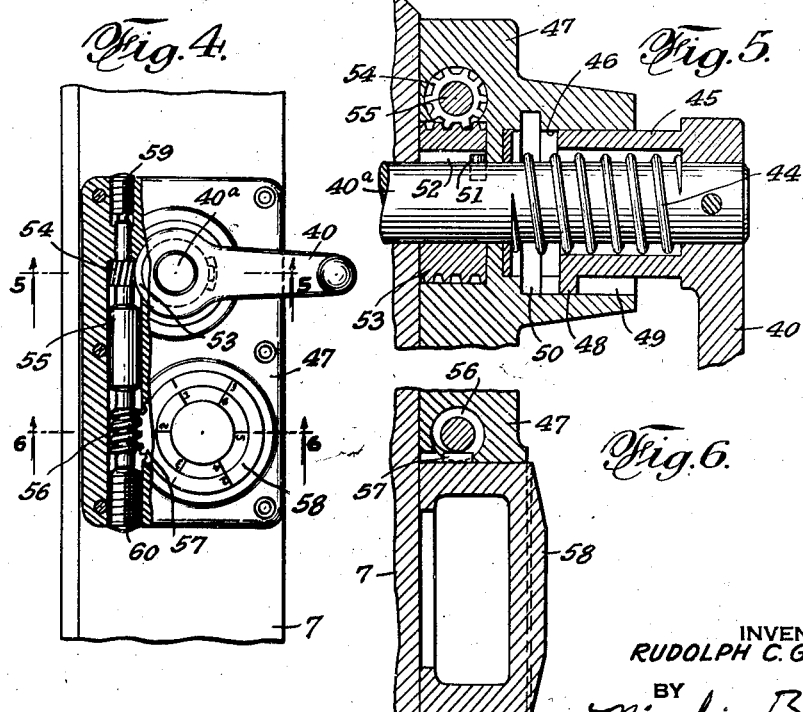
INVENTOR
RUDOLPH C. GOCHT
BY
ATTORNEYS Feb. 6, 1945.   R. C. GOCHT   2,369,039
TOOL SLIDE MECHANISM
Filed Nov. 26, 1940   4 Sheets-Sheet 4
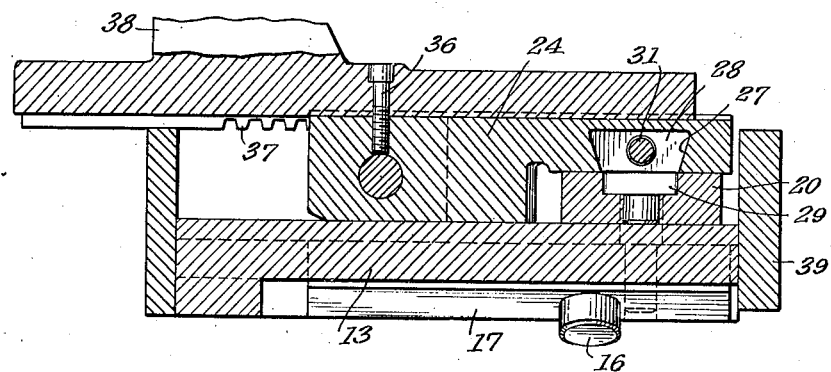
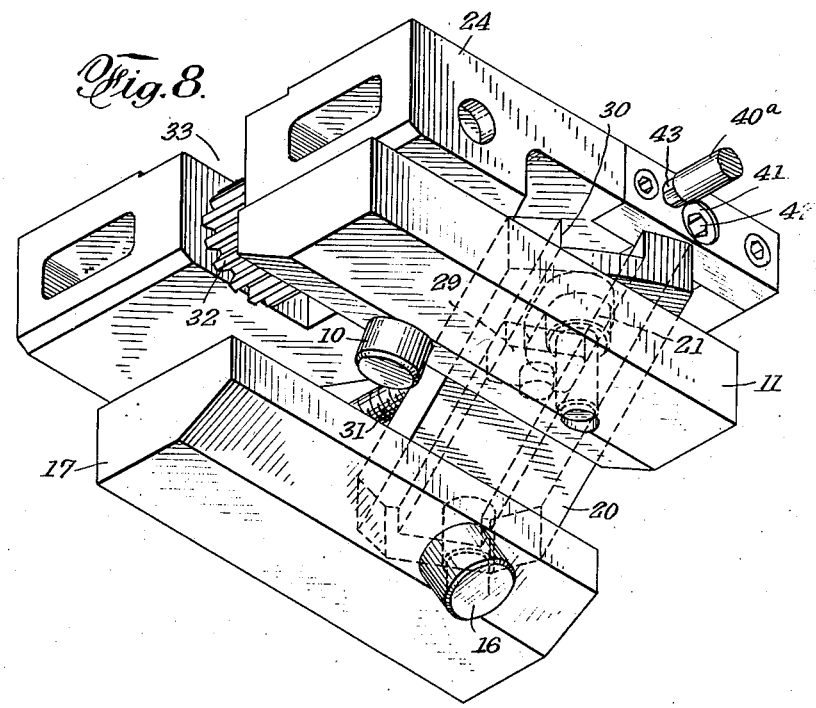
INVENTOR
RUDOLPH C. GOCHT
BY
ATTORNEYS Patented Feb. 6, 1945

2,369,039

UNITED STATES PATENT OFFICE 2,369,039

TOOLSLIDE MECHANISM

Rudolph C. Gocht, New Britain, Conn., assignor to The New Britain Machine Company, New Britain, Conn., a corporation of Connecticut Application November 26, 1940, Serial No. 367,169

16 Claims. (Cl. 29—37)

My invention relates to improvements in slide mechanisms and in particular to end tool slide mechanisms for machines such as lathes, multiple spindle screw machines and the like.

It is an object of this invention to provide improved slide feeding means for machines of the character indicated.

Another object is the provision of relatively simple means for adapting a machine of the character indicated to a wide variety of uses without the necessity of changing slide feeding cams.

It is also an object of this invention to provide improved, readily-adjustable means for providing the proper tool-feeding speed for any desired turning speed.

Another object is the provision of improved means for jump-feeding a tool up to the work prior to a relatively slow cutting feed.

It is a further object to provide improved means for adjustably varying the relationship of jump strokes to feed strokes of tool slides in machines of the general character indicated.

Still another object resides in the provision of means for adjustably varying the jump-stroke and the feed stroke relatively to each other without changing the time required for the combined performance of both jump and feed strokes.

A further object is to provide means for adjustably dividing a given stroke into any jump-stroke and any feed-stroke within the limits of the given stroke.

Another object may be seen in the provision of means associated with tool slide jump and feed mechanism for multiplying the amplitude of any given stroke or relationship of strokes produced by said jump and feed mechanism.

Still another object resides in the provision of means for adjustably varying jump and feed motions relatively to each other without in any way altering a predetermined total stroke, which always remains the sum of the jump and feed motions regardless of the position of adjustment.

Other objects and various features of the invention will become apparent to those skilled in the art from a reading of the following specification in conjunction with the drawings included herewith, which show, for illustrative purposes only, a preferred embodiment of the invention, and in which—

Fig. 3 is a partly sectionalized plan of the slide mechanism shown in Fig. 1, the slide-operating parts being shown in the same relationship as in Fig. 1;

Fig. 4 is a partly broken away and sectionalized detailed front elevation of adjusting means associated with the device illustrative of this invention;

Fig. 5 is an enlarged sectional detail of parts shown in Fig. 4 and taken on a plane substantially that indicated as 5—5 in Fig. 4;

Fig. 6 is an enlarged sectional detail of parts shown in Fig. 4 and taken substantially in the plane 6—6 of Fig. 4;

Fig. 7 is a fragmentary sectionalized detail of operating parts of the device illustrative of this invention and showing further features thereof, the parts being shown in the same relationship as in Fig. 2; and Fig. 8 is an isometric view of the operating parts in the device illustrative of this invention, the parts being shown in the same relationship as in Figs. 1 and 3.

Figure 1:
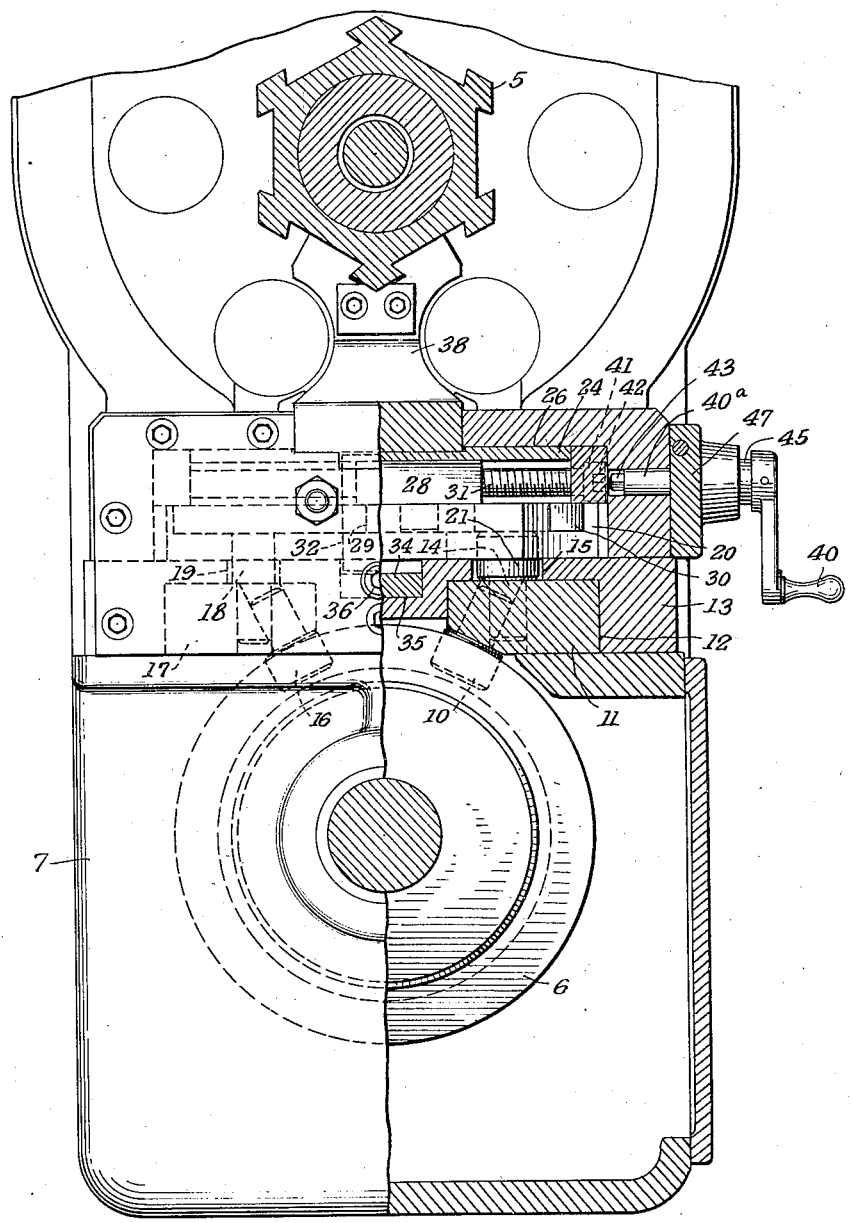
Fig. 1 is an end elevation in partial section of a portion of a conventional multi-spindle screw machine having a tool slide operated by a device illustrative of this invention, the tool slide operating parts being shown in their relative positions at the end of the jump and just prior to the feed operation into the work.

Briefly stated my invention in a preferred form includes means for obtaining a variety of jump and feed strokes for driving a tool slide—all from one standard jump and feed motion generating mechanism. By means of adjustable linkages intermediate the jump and feed mechanism and the tool slide, the respective transmitted effects of the jump and feed may be varied as desired within the limits of the total stroke obtainable.

In a preferred embodiment primary slide motion for a jump and feed stroke is derived from any desired means, preferably cam means. The separate jump and feed motions thus derived are preferably transmitted directly to spaced-apart points on a connecting member so that the motion of this connecting member is wholly dependent upon and determined by the jump and feed motions derived from the cams. I then transmit motion from any particular point on this connecting member to a tool slide. It will be readily appreciated that, by varying the point from which motion is picked up on this connecting member, various combinations of motions may be transmitted to the tool slide. In my preferred embodiment I provide a slidable pick-up or pivotal point associated with this connecting member, so that I may adjust the disposition of the pick-up point along the connecting member to obtain any desired combinations of jump and feed motions of the slide.

Before going into a more detailed specification of the operation of the specific embodiment shown I wish to state that the term "slide" as hereinafter used is, of course, intended to refer not only to the slide of the general nature shown in the drawings but also to include any tool-advancing means, such as cross slides or tool carriers, which may depend upon rotation to feed a tool into the work.

Figure 2:
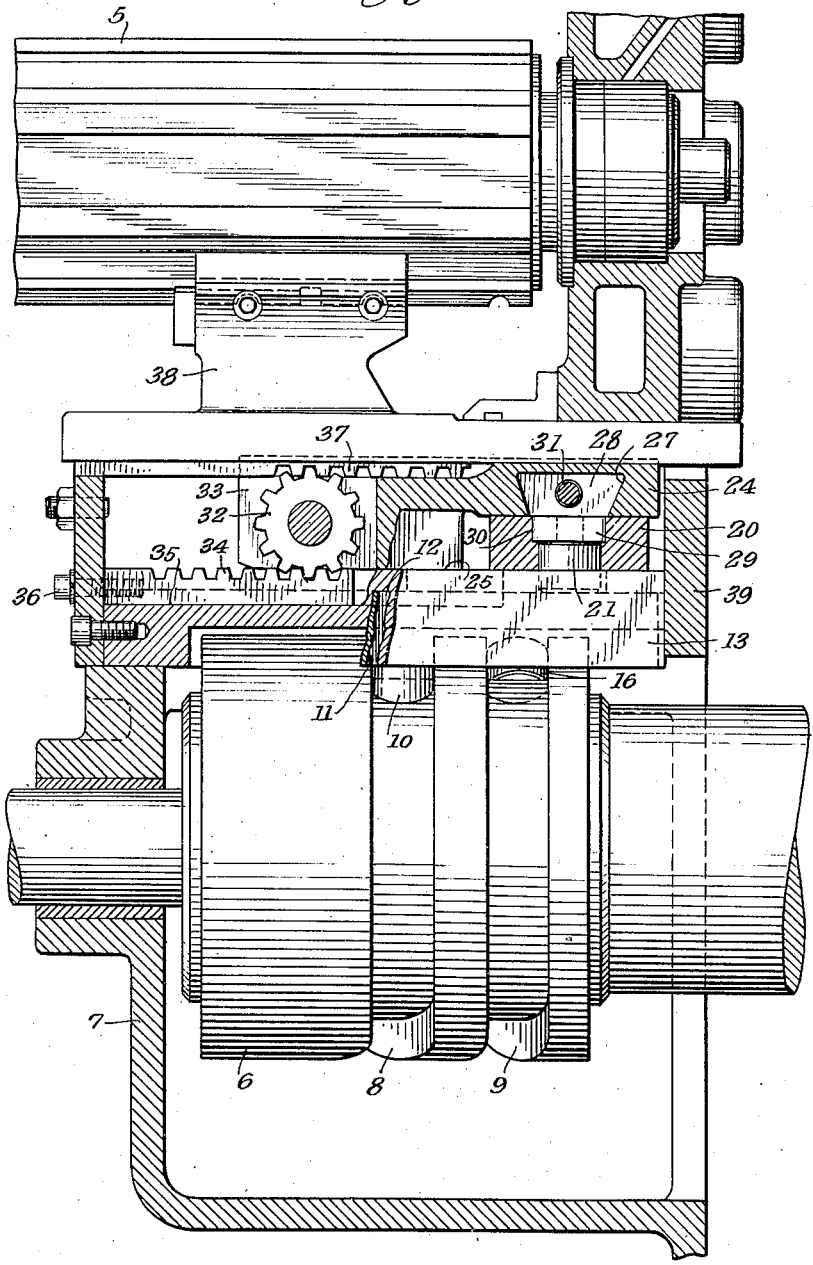
Fig. 2 is a side elevation in partial section of the parts shown in Fig. 1, the parts being shown as they are mutually related, just prior to the jump operation, that is, the tool slide is in fully retracted position.

Referring specifically to Figs. 1, 2 and 3, a preferred embodiment of my invention is shown incorporated in a well-known six-spindle screw machine equipped with an end-working tool slide 5, which may be of the well known "Gridley" type. The tool slide 5 is preferably fed primarily by cam means 6, journaled in the frame 7 of the machine. In a preferred form this cam includes two cam surfaces 8 and 9 for producing jump and feed motions, respectively, as will later be clear.

Motion derived from the jump cam surface 8 may be picked up by a cam-follower roll 10, to actuate the jump slide-bar 11, which is slidable within a track 12 on a part 13 of the frame. The jump slide-bar 11 preferably carries pin means 14, pivotally supporting a roller 21, which may project through a slot 15 in the upper surface of the base member 13.

In a similar manner the feed cam-follower roll 16 actuates a feed slide-bar 17, which is slidably mounted on the frame and in the same manner as the jump slide-bar 11. The slide bar 17 may likewise carry pin means 18, projecting through a longitudinal slot 19 in the base member 13. The portions of the jump and feed pins 14 and 18, respectively, projecting above the surface of the base member 13, are shown engaging opposite ends of a connecting member in the form of a bar or lever 20. The pin 18 is shown pivotally fixed to the connecting member 20, and the pin 14 is shown slidably pivoted in a slot 22 in the connecting member 20.

From a consideration of the linkage just described it will be clear that the motion of the connecting member or whiffletree 20 is wholly dependent upon the motions of the jump and feed bars 11 and 17 as determined by the respective cam surfaces 8 and 9. I prefer to provide adjustable means to transmit motion from the whiffletree 20 to the tool slide 5. Such means may be in the form of an intermediate sliding block 24, slidable longitudinally in ways or tracks 25—26 on the frame 7 of the machine.

For adjustably connecting the block 24 to the bar or whiffletree 20 I may provide a transverse dovetail slide track 27 on the intermediate sliding block 24 and adjustably dispose a dovetail pivot block 28 within the slot 27. The pivot block 28 pivotally carries a sliding block member 29, which is slidable in a corresponding receiving slot 30 running lengthwise of the connecting member or whiffletree 20.

In order adjustably to control the location of the dovetail block 28 within the transverse slot 27 I prefer to employ screw means 31 extending longitudinally of the slot 27 and threaded through the block 28. The means I employ for controlling the screw means 31 will be described later.

As has been indicated, the cams, together with the bar member or whiffletree 20 which is adjustably connected to the sliding block 24, may serve directly to drive the main tool slide 5. While I show an intermediate rack-and-pinion drive mechanism, to be later described and which is at times operative to drive the tool slide from the whiffletree 20, I may drive the tool slide directly without the rack-and-pinion means. As shown (Fig. 7) the sliding block 24 may be secured as by means of a screw 36 to the base of a pedestal 38, connected to the tool slide 5, the base of the pedestal 38 being slidably mounted on the frame. Thus, when the feed cams are rotated, the whiffletree will be rocked; and, due to its connection through block 24 with the pedestal 38 and main tool slide, the latter will be fed, all as will be more fully described in connection with the operation of the machine.

In accordance with one aspect of my invention I may employ, either independently of or in connection with the mechanism heretofore described, means for producing a plurality of feed movements of the main tool slide without changing cams. In the particular form shown I employ rack and pinion means for multiplying the feeding action of the cam means on the tool slide.

In the form illustrated I equip the intermediate sliding block member 24 with an idler pinion 32, freely rotatable and extending within a recessed portion 33 of the block 24. The pinion 32, in the preferred form shown, is always engageable with two opposed racks. One of these racks 34 is slidable within a fixed track or way 35 on the member 13 integral with or fixed to the frame 7 of the machine. In the setting shown in Fig. 2 the rack 34 is secured to a frame member by screw means 36. The other rack member 37, which the pinion 32 also engages, may form a part of the sliding pedestal or base 38 for the tool slide 5. This rack and pedestal unit 37—38 is slidable with respect to the frame of the machine and with respect to the intermediate sliding block 24. It will be appreciated, referring to Fig. 2, that, as the motion longitudinally of the tool slide 5 is imparted to the intermediate sliding block 24, the rack 34 being fixed to the frame, the pinion 32 is forced to rotate and at the same time to propel rack 37, together with the pedestal 38 and the tool slide 5, at a speed twice that of the driving speed of the member 24.

In order to obtain a different speed relationship, that is, a direct drive between intermediate sliding member 24 and the tool slide 5, the screw means 36 may be removed from its position shown in Fig. 2 and employed, as shown in detail in Fig. 7, to secure the rack-pedestal 37—38 to the intermediate slide member 24 and at the same time to release the rack 34 from its engagement with the frame, so that it may slide freely within its track 35, as will be clear.

From a consideration of the linkages which have been described to this point it will be seen that, with the tool slide 5 in fully retracted position (Figs. 2, 7), the whiffletree 20 will be positioned directly transversely of the tool slide 5. As the cam 6 rotates, the first cam surface which becomes effective upon one of the cam-follower rolls is that of the jump-feed surface 8. This surface engages cam-follower roll 10 to feed the jump slide-bar 11 forward along with it. While the pin-roller 21 is so being carried along it serves to operate the whiffletree 20 as a lever and at the end of the jump operation the whiffletree will assume an oblique position, as shown in Fig. 3. While the pump cam surfaces 8 has thus been active it will be appreciated that the feed roller 16, operated by the feed cam surface 9, has been running through a dwell portion of the cam surface 9, so that the feed pin 18 has remained fixed and has served as a point about which the whiffletree may rotate into the position shown in Fig. 3. As this rotation took place the block 29 was necessarily carried along with the whiffletree and made to propel the tool slide an amount proportional to its displacement from the feed pin 18, associated with the feed slide bar 17.

When the jump-feed has been accomplished rotation of the cam 6 has brought the feed surface of the cam groove 9 up to a position to engage the feed cam-follower roll 16; and, as this cam surface continues in operation the whiffletree begins another rotary movement, but this time about the pin-roller 21, associated with the jump-feed means, as a center. During this rotation, that is, during the feed, the feed displacement has been proportional to the radial distance between the pin roller 21 and the pivot pin carried by the sliding blocks 28—29, as will be understood. Of course, this radius necessarily changes because the pin-roller 21 during the feed operation is permitted to slide within the take-up slot 22. It will be understood that, upon completion of the feed stroke, the whiffletree is again in direct transverse relation to the axle of the tool slide 5, but a distance away from the back wall 39 equal to the total feed, that is, jump feed plus work feed imparted to it by the cams.

Referring to Figs. 1, 3 and 8, and in particular to Figs. 4 and 5, the manual adjustment means which I prefer to use in determining the lateral position of the block 28 in the slide track 27 may be seen to include cranking means 40 journaled in the frame. The end of the lateral screw 31 nearest the crank 40 has a head 41 (Figs. 1 and 8), having a key-receiving opening 42 therein. When the whiffletree is in its most advanced position, that is, after both jump and feed strokes have been completed, it has carried the intermediate sliding block member 24 to its farthest forward position. In this position the key-receiving-opening 42 on the transverse adjusting screw member 31 is concentric with a corresponding key portion 43 on the shaft of crank 40. Since in this position the key portion 43 overstands its receiving aperture 42, the key may be thrust directly into its receiving opening. The crank 40, as will be clear, is normally in an outwardly projected position, as shown in Fig. 5, so that the key 43 is disengaged from the screw 31. This position is forcibly maintained by a compression spring 44, coiled about the shaft at crank 40, as will be clear.

The crank 40 has a longitudinally extending sleeve portion 45, extending about the spring 44 and slidably received within a counterbored portion 46 of the housing 47 on the frame. The sleeve 45 preferably carries a radially projecting key or ear 48 which, when the crank 40 is in its normal outwardly extended position, is received in a corresponding longitudinally extending slot or keyway 49 formed in the counterbored portion 46. Within the counterbored portion 46 I provide an annular groove 50 to receive the key 48 when the crank is in its inward position, that is, when the key 43 is engaged with the key-receiving opening 42. It will be seen that a slight rotation of the crank 40, after it has been engaged with the screw member 31, will, because of the locking effect between the ear 48 and groove 50, be maintained in such engaged position.

Visual indication means may be provided to indicate the position to which the sliding block 28 has been moved by rotation of the adjusting crank. The shaft of the crank 40 preferably carries a key member 51, located at a point on its circumference and engaging a keyway 52 on a worm 53 on the crank shaft. The worm 53 meshes with a worm wheel 54 fixed to a shaft 55, thus forming a reduction gear train to rotate shaft 55 proportional to, but at a reduced speed from, the adjustment speed of screw 31. The shaft 55 also carries a worm 56, which is suitably geared, as by the worm wheel 57, to a counter disk 58. The screw members 59 and 60 serve as axial adjustment means for the shaft 55 to align the respective worm and worm-wheel trains properly.

The counter disk 58 may be provided with two indicating scales, as shown in Fig. 5, one to represent feed characteristics with the rack locking screw means 36 in the position shown in Fig. 2, that is, when the pinion-stroke multiplier device as above described is employed; and the other scale of which may be employed to indicate stroke characteristics with a direct feed, that is, when the screw member in the position shown in Fig. 7 is employed.

It will be understood that the counter mechanism will only operate when the key 43 is in locked relation with the key-receiving-opening 42 of the screw shaft 31, because it is only possible to release the crank 40 from engaged relation with the screw shaft 31 when the ear 48 is in alignment with the keyway 49. Once it is released from such locked position, the ear 48 by its engagement with the keyway 49 prevents any rotation of the crank 40, and hence any alteration in the scale reading on the indicating plate 58.

To illustrate the mode of operation of the preferred form of my invention shown, I will describe a typical setting-up operation.

Let us assume that with a direct feed (i. e. without the pinion 32—Fig. 7) a total tool slide stroke of three inches may be obtained and that by using the multiplier (pinion 32, Fig. 2) a six inch total slide stroke may be obtained. The cam surfaces 8—9, respectively, will be understood to have equal jump and feed rises.

Now, supposing we want a feed of one and one-half inches to take place while the feed-cam surface 9 is operative, and that a rather long jump is necessary in order to advance the cutting tool up to the work. We should then elect to use the multiplier, because it provides a six-inch total stroke, and employ a four-and-one-half-inch jump to a one-and-one-half inch feed; that is, a jump-to-feed relation of 3 to 1. From this it follows that it will be necessary so to locate the pivot blocks 28—29 between pins 18 and 14 that the distance from the pivotal center of the pivot blocks to the center of pin 14 is one-fourth the distance from the center of the pivot blocks to the pin 18. This adjustment will of course be made when the intermediate sliding block 24 (and consequently the tool slide 5) is in fully advanced position, so that the crank 40 may be operative and so that the position of the scale 58 corresponding to the multiplier will give an indication of the proper disposition of the blocks 28—29 with respect to the centers of pins 14 and 18, respectively. Since we are using a multiplier (pinion 32), it will be necessary to employ the screw means 36 (as in Fig. 2) to lock or secure the rack 34 to the frame, so that, as the intermediate sliding block member 24 carrying the pinion 32 is made to slide, the tool slide 5 will be carried back and forth at a speed twice that of the intermediate sliding block.

Should it not be necessary to employ such a long jump to get the tool up to the work and yet a feed stroke of one-and-one-half inches is desired, this may be obtained by using a jump of one-and-one-half inches and a feed of one-and-one-half inches, that is, by adjusting the block 28 so that it is exactly at the point midway between the pins 14 and 18 and by removing the screw 36 to release rack 34 from the frame and inserting it as shown in Fig. 7 to lock the rack-pedestal members 37—38 to the intermediate slide block 24 for a direct drive.

It will be understood that, although the operation of my improved universal feeding mechanism has been described for separate and independently operated jump and feed motions, there is no intention so to limit the invention. It would be possible to obtain even quicker jump action by employing both the jump and feed cam surfaces simultaneously for portions of their respective effective strokes. In such a case the feed operation would be calculated to take effect by continuing to operate after completion of the jump. It will, of course, be appreciated that, with such partially concurrent operation of jump and feed cams, a larger portion of the cam may be devoted to the feed—and thus a more prolonged feed obtained. In order to conserve as much of the jump and feed cam surfaces as possible for the operating strokes and for the dwell during indexing of the spindle carrier of the machine, it is considered preferable to have both cams designed to cooperate to retract concurrently—thus providing relatively fast retraction—although, naturally, the respective cams could be designed to retract independently.

It may be well to point out that my invention may be of most importance in jobbing shops where a multiple spindle, or other machine, may be required to turn out a large variety of work, and where speed in setting up the machine is of great or perhaps of utmost importance. My invention provides means for very readily adjusting the tools without even the necessity of changing the operating cams. As I have shown my illustrative embodiment, only one cam need be employed to obtain the large variety of jump and feed stroke relationships; however, it is to be understood that, as the disposition of the cams is hardly material to this invention, they may be separate and either of the drum or disc type.

It will be seen that I have provided a relatively simple and very effective means for obtaining any combination of jump or feed stroke within a rather large range. Although this means has been shown particularly in connection with a tool slide carrying end-working tools, of course it is not intended so to be limited; and it is to be understood that various changes, additions, modifications, and omissions may be made within the scope of the invention as defined in the appended claims.

I claim:

1. In a device of the character indicated, slide means, means for jump-feeding and means for work-feeding the same, and means for connecting said jump-feeding means and said work-feeding means to said slide means, said last-mentioned means including means for multiplying the respective travels of said jump-feeding means and said work-feeding means.

2. In a multi-spindle machine of the character indicated, a tool slide guide, a tool slide mounted on said guide, a pedestal member adjustably secured to said tool slide, a generally transversely extending bar member, common pivot means for adjustably connecting said generally transverse member and said pedestal member, and a pair of feed means connected to said generally transverse member in spaced-apart relation.

3. In a multi-spindle machine of the character indicated, tool slide guiding means, a tool slide mounted on said guiding means, a supporting or pedestal member adjustably securable to said tool slide, said pedestal member having a transversely extending slot, a generally transversely extending bar member having a slot extending generally lengthwise thereof, common pivot means receivable in each of said slots for adjustably controlling the pivotal relation of said generally transverse member to said pedestal member, a pair of feed members pivotally connected to the ends of said generally transverse member, and cam means for actuating said feed members.

4. In a turning machine of the general character indicated, an end-working tool carrier, a pedestal, means for adjustably connecting said carrier and pedestal, rack teeth on said pedestal, a floating block member slidable with respect to said pedestal, pinion means carried by said floating block member and engageable with said rack teeth, rack means in fixed relation to the frame of the machine and engageable with said pinion means simultaneously with the engagement of said pinion means and said first-mentioned rack teeth, and feed means for said floating block member.

5. In a turning machine of the general character indicated, an end-working tool slide, a pedestal, means for adjustably connecting said slide and said pedestal, rack teeth on said pedestal, a floating block member slidable with respect to said pedestal, pinion means carried by said floating block member and engaged with said rack teeth, rack means in fixed relation to the frame of the machine and engaged with said pinion means simultaneously with the engagement of said pinion means and said first-mentioned rack teeth, means for disengaging said rack means from fixed relation to the frame and for securing said floating member to said pedestal, and feed means for said floating block member.

6. In a device of the general character indicated, a slide member, rack means on said slide member, a floating member slidable with respect to said slide member, pinion means carried by said floating member and engaged with said rack means, fixed rack means engaged with said pinion means, pivot means carried by said floating member and adjustable transversely thereof, bar means engaged by said pivot means, and a pair of spaced-apart feed means for said bar means, for the purpose described.

7. In a device of the general character indicated, a slide member, rack means on said slide member, a floating member slidable with respect to said slide member, pinion means carried by said floating member and engaged with said rack means, fixed rack means engageable with said pinion means, means for releasing said fixed rack means and for securing said floating member to said slide member, pivot means carried by said floating member and adjustable transversely thereof, bar means engaged by said pivot means, and a pair of spaced-apart feed means for said bar means, for the purpose described.

8. In a device of the general character indicated, a slide member, rack means on said slide member, a floating member slidable with respect to said slide member, pinion means carried by said floating member and engaged with said rack means, fixed rack means engaged with said pinion means, means for releasing said fixed rack means and for securing said floating member to said slide member, pivot means carried by said floating member and adjustable transversely thereof, bar means engaged by said pivot means, a pair of feed members pivotally connected to and spaced-apart on said bar means, and cam means for actuating said feed members.

9. In a machine of the character indicated, a frame, a plurality of cam means, a plurality of cam-follower means slidable on the frame, bar means, means for pivotally connecting said bar means with a plurality of said cam-follower means, and slide means adjustably connected pivotally to said bar means.

10. In a machine of the character indicated, a frame, jump and feed cam means, jump and feed cam-follower slide means, bar means, means pivotally connecting said bar means with said jump and feed cam-follower slide means, said bar means having a longitudinally extending slot, slide means having a transversely extending slot, common pivot means slidable in each of said slots, and screw-controlled means for adjustably securing said common pivot means.

11. In a machine of the character indicated, a frame, a plurality of feed means, bar means, means for connecting said bar means to a plurality of said feed means, slide means, means for adjustably connecting said bar means pivotally to said slide means, said adjustable connecting means including a pivotal connecting member slidable transversely of said slide means, screw means threaded into said pivotal connecting member, means for rotating said screw means, said rotating means including manual control means accessible externally of the frame of the machine and visual indicating means for indicating the positioning of said pivotal connecting member.

12. In a machine of the character indicated, a frame, a generally longitudinally extending tool slide, jump and feed means for said tool slide, said jump and feed means including jump cam means on one side of said tool slide and feed cam means on the other side of said tool slide, jump and feed cam-follower slide means, bar means, means for connecting said cam-follower slide means to said bar means, and adjustable pivot means for adjustably connecting said bar means to said tool slide.

13. A tool holder, means for imparting a plurality of feed movements to said tool holder, said means including adjustable means for varying the relationship of the plurality of feed movements with respect to each other, said means also including adjustable means for predetermining the magnitude of the respective feed movements imparted to said tool holder.

14. In a device of the character indicated, a fed member, a lever beam for feeding said member, means for feeding opposed points on said beam in the same direction to predetermined end points, means for adjustably connecting said fed member to said lever beam at various points between said opposed points while maintaining the same relative position between said fed member and said lever beam, whereby said lever beam will always feed said fed member to the same point while the relative feeding movements imparted to said fed member by movement of said lever beam at said opposed points will vary with the point of adjustable connection between said fed member and said lever beam.

15. In a device of the character indicated, a lever beam, two feeding members and one fed member connected to said lever beam at spaced apart points, at least one of said members having its connection to said lever beam adjustable along the length of said lever beam while maintaining the same relative feed position between said one of said members and said lever beam, whereby said lever beam will always feed said fed member to the same point while the relative feeding movements imparted to said fed member from said feeding members will vary with the point of adjustment of said one of said members along the length of said lever beam.

16. In a device of the character indicated, a fed member, a lever beam, a pair of feeding members, means for connecting said feeding members to spaced apart points on said lever beam, said lever beam being free to rock about both of said spaced apart points, and means for connecting said fed member to said lever beam between said spaced apart points, said means for connecting said fed member to said lever beam comprising an adjustable connection for adjustably connecting said fed member to said lever beam at points along the length of said lever beam and between said spaced apart points.

RUDOLPH C. GOCHT.